United States Patent
Ni et al.

(10) Patent No.: US 12,190,238 B2
(45) Date of Patent: Jan. 7, 2025

(54) METHOD, DEVICE, AND PROGRAM PRODUCT FOR PROCESSING SAMPLE DATA IN INTERNET OF THINGS ENVIRONMENT

(71) Applicant: EMC IP Holding Company LLC, Hopkinton, MA (US)

(72) Inventors: Jiacheng Ni, Shanghai (CN); Jinpeng Liu, Shanghai (CN); Qiang Chen, Shanghai (CN); Zijia Wang, WeiFang (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 815 days.

(21) Appl. No.: 17/402,803

(22) Filed: Aug. 16, 2021

(65) Prior Publication Data
US 2023/0033980 A1    Feb. 2, 2023

(30) Foreign Application Priority Data

Jul. 23, 2021    (CN) .......................... 202110836841.6

(51) Int. Cl.
*G06N 3/08*    (2023.01)
*G06F 16/28*    (2019.01)
(Continued)

(52) U.S. Cl.
CPC ............. *G06N 3/08* (2013.01); *G06F 16/285* (2019.01); *G06F 18/214* (2023.01); *G06V 40/172* (2022.01); *G16Y 10/75* (2020.01)

(58) Field of Classification Search
CPC ....................................................... G06N 3/08
(Continued)

(56) References Cited

U.S. PATENT DOCUMENTS

| 7,337,186 B2 * | 2/2008 | Inokuchi | G16C 20/70 |
|---|---|---|---|
| | | | 707/999.102 |
| 11,640,536 B2 * | 5/2023 | Kain | G06N 3/04 |
| | | | 706/20 |

(Continued)

OTHER PUBLICATIONS

Wikipedia, "Deep Learning," https://en.wikipedia.org/wiki/Deep_learning#Deep_neural_networks, Mar. 1, 2021, 32 pages.

(Continued)

*Primary Examiner* — Reza Nabi
(74) *Attorney, Agent, or Firm* — Ryan, Mason & Lewis, LLP

(57) ABSTRACT

The present disclosure relates to a method, a device, and a program product for processing sample data in an Internet of Things environment. A method in one embodiment includes: receiving features of the sample data from an encoder deployed in a remote device in the Internet of Things environment; acquiring a category probability corresponding to the sample data based on a classifier deployed in a local device in the Internet of Things environment and the features; and classifying the sample data to a predetermined category in response to determining that the category probability satisfies a first threshold condition. Further, a corresponding device and a corresponding program product are provided. With example implementations of the present disclosure, computing resources of devices in an Internet of Things environment can be fully utilized to process sample data.

20 Claims, 10 Drawing Sheets

(51) Int. Cl.
*G06F 18/214* (2023.01)
*G06V 40/16* (2022.01)
*G16Y 10/75* (2020.01)

(58) Field of Classification Search
USPC .......................................................... 706/20
See application file for complete search history.

(56) References Cited

U.S. PATENT DOCUMENTS

| | | | | |
|---|---|---|---|---|
| 11,735,018 | B2* | 8/2023 | Khadloya | G06V 40/50 348/155 |
| 2002/0113687 | A1* | 8/2002 | Center, Jr. | G07C 9/37 340/5.82 |
| 2015/0146987 | A1* | 5/2015 | Tang | G06T 11/60 382/195 |
| 2016/0359864 | A1* | 12/2016 | Dhaliwal | H04L 63/0861 |
| 2017/0032398 | A1* | 2/2017 | Li | G06F 11/0721 |
| 2017/0332950 | A1* | 11/2017 | Yu | G06V 30/242 |
| 2018/0114142 | A1* | 4/2018 | Mueller | G06F 16/906 |
| 2019/0102678 | A1* | 4/2019 | Chang | G06V 10/82 |
| 2019/0295125 | A1* | 9/2019 | Marino | G06Q 30/0641 |
| 2020/0068112 | A1* | 2/2020 | Zhang | H04N 23/681 |
| 2021/0010954 | A1* | 1/2021 | Adler | G06V 10/82 |
| 2021/0241304 | A1* | 8/2021 | Benkreira | G06Q 30/0215 |
| 2021/0387346 | A1* | 12/2021 | Gillett | B25J 19/0075 |
| 2022/0018221 | A1* | 1/2022 | Zhang | E21B 43/00 |
| 2022/0044094 | A1* | 2/2022 | Zheng | G06N 3/082 |
| 2022/0171998 | A1* | 6/2022 | Ni | G06V 40/70 |
| 2023/0033980 | A1* | 2/2023 | Ni | G06N 3/09 |
| 2023/0044156 | A1* | 2/2023 | Mehta | H04L 63/20 |
| 2023/0116125 | A1* | 4/2023 | Elcock | G10L 17/04 704/246 |
| 2024/0119130 | A1* | 4/2024 | Hu | G06F 21/32 |

OTHER PUBLICATIONS

Wikipedia, "Autoencoder," https://en.wikipedia.org/wiki/Autoencoder, Feb. 22, 2021, 13 pages.

Wikipedia, "k-Means Clustering," https://en.wikipedia.org/wiki/K-means_clustering, Mar. 6, 2021, 16 pages.

F. Schroff et al., "FaceNet: A Unified Embedding for Face Recognition and Clustering," arXiv:1503.03832v3, Jun. 17, 2015, 10 pages.

D. Yi et al., "Learning Face Representation from Scratch," arXiv:1411.7923v1, Nov. 28, 2014, 9 pages.

U.S. Appl. No. 17/195,116, filed in the name of Jiacheng Ni et al. on Mar. 8, 2021, and entitled "Method, Device, and Computer Program Product for Updating Model.".

* cited by examiner

METHOD, DEVICE, AND PROGRAM PRODUCT FOR PROCESSING SAMPLE DATA IN INTERNET OF THINGS ENVIRONMENT

RELATED APPLICATION(S)

The present application claims priority to Chinese Patent Application No. 202110836841.6, filed Jul. 23, 2021, and entitled "Method, Device, and Program Product for Processing Sample Data in Internet of Things Environment," which is incorporated by reference herein in its entirety.

FIELD

Implementations of the present disclosure relate to the Internet of Things (IoT) and more specifically, to a method, a device, and a computer program product for processing sample data in an Internet of Things environment.

BACKGROUND

With the development of Internet of Things technology, a variety of sensors can be deployed into an Internet of Things environment to collect sample data. Computing devices in the Internet of Things can be utilized to process the collected sample data in order to implement a variety of functions. For example, in an access control system based on face recognition, camera devices can be used to collect image data of various users, and it can be determined whether these users can be allowed to enter based on neural network technologies. For another example, camera devices, temperature/humidity sensors, etc., can be deployed in a production line to collect state information of each location in the production line, and it can be determined whether there is an abnormality in the production line based on neural network technologies. However, computing devices in the Internet of Things have limited processing power and thus have difficulty in performing complex operations that require a large number of computing resources. At this point, how to process the collected sample data in the Internet of Things environment with higher efficiency has become a technical problem.

SUMMARY

Illustrative embodiments disclosed herein provide a technical solution for processing sample data in a more effective manner. The technical solution in some embodiments is compatible with existing Internet of Things environments and can utilize various computing devices in existing Internet of Things environments to process sample data in a more effective manner.

According to a first aspect of the present disclosure, a method for processing sample data in an Internet of Things environment is provided. The method includes: receiving features of the sample data from an encoder deployed in a remote device in the Internet of Things environment; acquiring a category probability corresponding to the sample data based on a classifier deployed in a local device in the Internet of Things environment and the features; and classifying the sample data into a predetermined category in response to determining that the category probability satisfies a first threshold condition.

According to a second aspect of the present disclosure, an electronic device is provided, including: at least one processor; and a memory coupled to the at least one processor, wherein the memory has instructions stored therein which, when executed by the at least one processor, cause the device to perform the method according to the first aspect of the present disclosure.

According to a third aspect of the present disclosure, a computer program product is provided. The computer program product is tangibly stored on a non-transitory computer-readable medium and includes machine-executable instructions for performing the method according to the first aspect of the present disclosure.

BRIEF DESCRIPTION OF THE DRAWINGS

In combination with the accompanying drawings and with reference to the following detailed description, the features, advantages, and other aspects of implementations of the present disclosure will become more apparent, and several implementations of the present disclosure are illustrated here by way of examples rather than limitation. In the accompanying drawings.

DETAILED DESCRIPTION

Example implementations of the present disclosure will be described in more detail below with reference to the accompanying drawings. Although example implementations of the present disclosure are illustrated in the accompanying drawings, it should be understood that the present disclosure may be implemented in various forms and should not be limited by the implementations illustrated herein. Instead, these implementations are provided in order to make the present disclosure more thorough and complete, and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another implementation" means "at least one additional implementation." The terms "first," "second," and the like may refer to different or identical objects. Other explicit and implicit definitions may also be included below.

Figure 1:
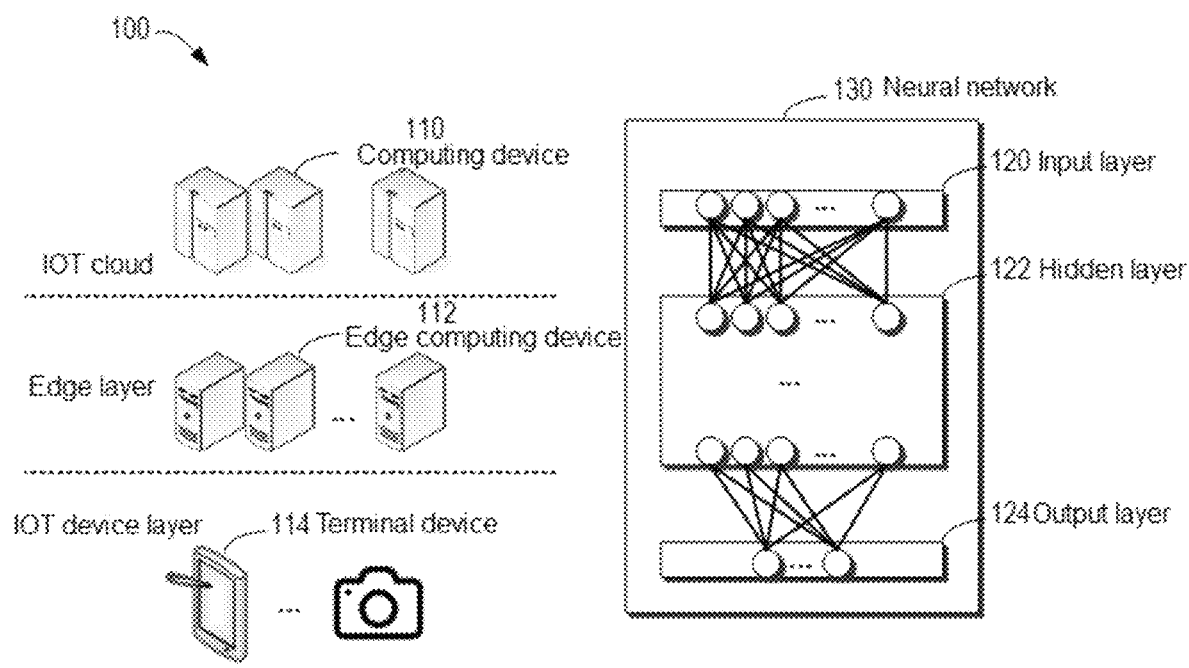
FIG. 1 schematically illustrates a block diagram of an IoT environment in which a neural network model can be deployed.

An overview of a storage system will first be described with reference to FIG. 1. FIG. 1 schematically illustrates block diagram 100 of an IoT environment in which a neural network model can be deployed. As shown in FIG. 1, the IoT environment may include an IoT cloud, an edge layer, and an IoT device layer. The IoT cloud may include one or more computing devices 110, and these computing devices 110 usually have abundant computing resources and storage resources and thus can perform complex computing tasks. The edge layer may include one or more edge computing devices 112, and these edge computing devices 112 usually only have limited computing resources and storage resources and thus cannot perform complex computing tasks. The IoT device layer may include one or more terminal devices 114, such as mobile terminals and cameras, and these terminal devices 114 can collect sample data and perform simple computing tasks.

At present, it has been proposed to deploy applications based on neural network 130 in an Internet of Things environment to process collected sample data. As described in FIG. 1, sample data collected by terminal devices 114 can be input into neural network 130 via input layer 120 of neural network 130, and hidden layer 122 can involve complex processing and can map the input sample data to a feature vector. Further, the feature vector can be further mapped to output layer 124 to output processing results for the sample data. However, neural network 130 usually requires a large number of computing resources and is difficult to implement at the edge layer and the IoT device layer.

To address the shortcomings in existing technical solutions, example implementations of the present disclosure provide a technical solution for processing sample data based on a neural network. For ease of description, the details of an example implementation according to the present disclosure will be described below using only an access control system based on face recognition as an example of a neural network. It will be understood that an example implementation according to the present disclosure can also be applied to neural networks that implement other functions. In a company's access control system, cameras can be deployed to collect face images of users, and then a neural network can be used to identify the collected face images to determine which employees they belong to. If the identified employee has an access permission, entry is allowed; otherwise, entry can be denied.

Figure 2:
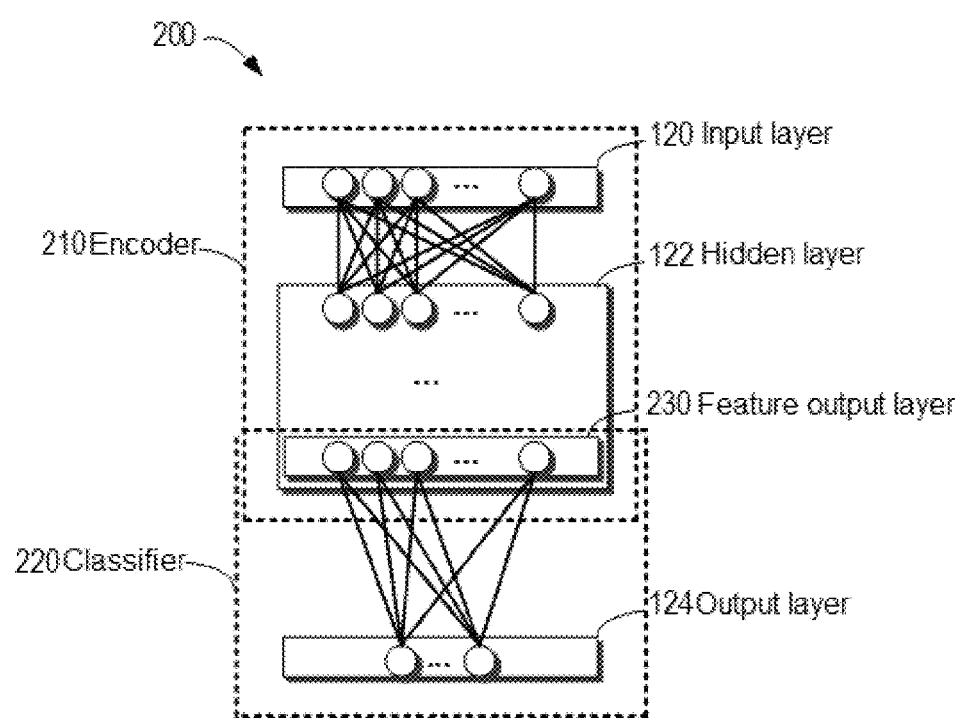
FIG. 2 schematically illustrates a block diagram of a neural network model for processing sample data according to an example implementation of the present disclosure.

Hereinafter, an overview of an example implementation according to the present disclosure will be described with reference to FIG. 2. It will be understood that Facenet is an advanced neural network model for face recognition, verification, and classification. Hereinafter, more details of an example implementation according to the present disclosure will be described using the Facenet model as an example. FIG. 2 schematically illustrates block diagram 200 of a neural network model for processing sample data according to an example implementation of the present disclosure. As shown in FIG. 2, the neural network model implemented based on Facenet can be divided into two parts, encoder 210 and classifier 220. In this case, encoder 210 may include input layer 120 and hidden layer 122, that is, include parts other than output layer 124. Classifier 220 may include output layer 124 and the penultimate layer (i.e., feature output layer 230) in the neural network.

Since encoder 210 requires a large amount of computing resources, encoder 210 can be deployed at a remote device (e.g., one or more computing devices 110 in the IoT layer with high computing power) in the IoT environment. Since classifier 220 does not require many computing resources, classifier 220 can be deployed at a local device (e.g., edge computing device 112 and/or terminal device 114 in the edge layer and/or IoT device layer) in the IoT environment. With the example implementation of the present disclosure, on the one hand, abundant computing resources in the IoT cloud can be utilized as much as possible to determine features of the sample data, and on the other hand, the limited computing power of devices in the edge layer and/or IoT device layer can be fully utilized to perform classification operations based on the features from the IoT cloud. In this way, the performance of the neural network model can be improved as much as possible without excessive network transmission.

Figure 3:
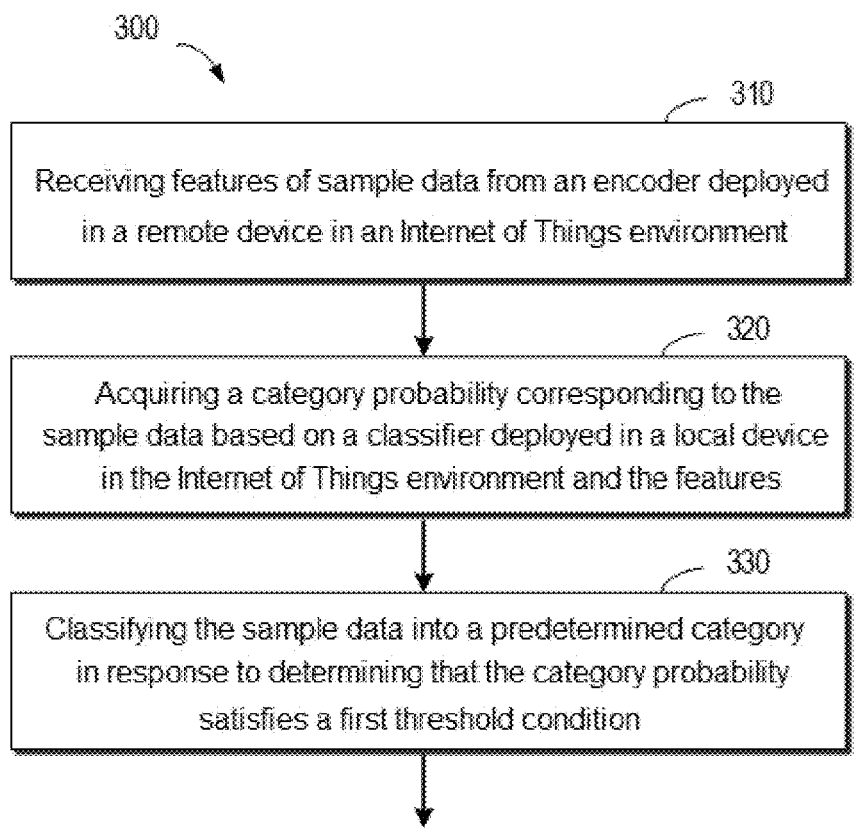
FIG. 3 schematically illustrates a flow chart of a method for processing sample data according to an example implementation of the present disclosure.

Hereinafter, more details of an example implementation according to the present disclosure will be described with reference to FIG. 3. FIG. 3 schematically illustrates a flow chart of method 300 for processing sample data according to an example implementation of the present disclosure. According to this example implementation of the present disclosure, collected sample data can be transmitted to encoder 210, and relevant features can be received from encoder 210. Specifically, as shown in FIG. 3 and at block 310, features of the sample data can be received from encoder 210 deployed in a remote device in the Internet of Things environment.

Figure 4A:
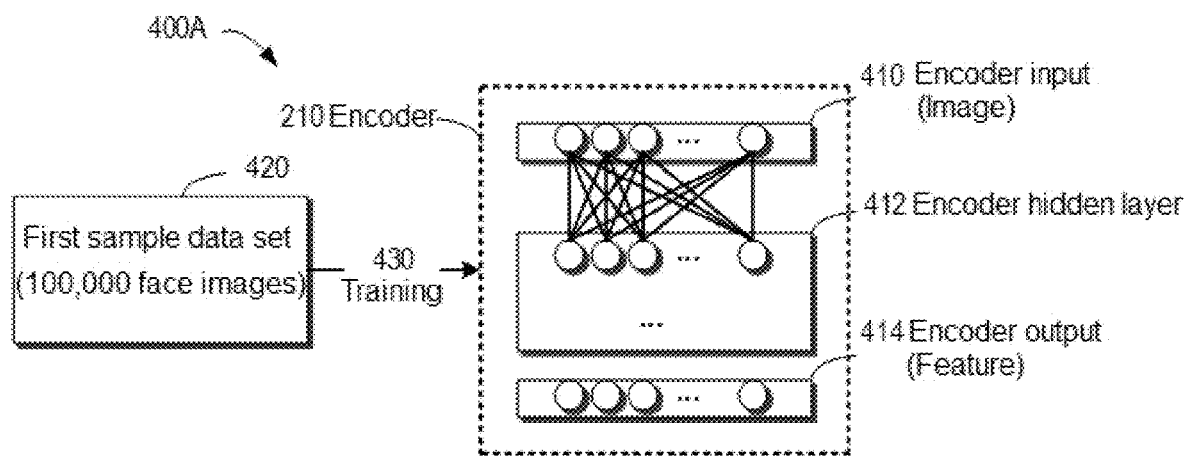
FIG. 4A schematically illustrates a block diagram for training an encoder in a neural network model according to an example implementation of the present disclosure.

It will be understood that encoder 210 should accurately describe the features of each piece of sample data, and thus a training data set (e.g., referred to as a first sample data set) including a large number of samples can be utilized to train that encoder 210. Hereinafter, more details regarding the generation of encoder 210 will be described with reference to FIG. 4A. FIG. 4A schematically illustrates block diagram 400A for training an encoder in a neural network model according to an example implementation of the present disclosure. As shown in FIG. 4A, encoder 210 may include encoder input 410, encoder hidden layer 412, and encoder output 414. Here, encoder input 410 can receive training samples from first sample data set 420. For acquiring face features more accurately, first sample data set 420 may include face images (e.g., 100,000 face images) from a large number of users having a wide variety of different facial characteristics and other facial features.

Encoder 210 can be trained 430 based on training techniques that have been developed currently and/or will be developed in the future, as will be readily apparent to those skilled in the art. After training with the large number of face images, encoder 210 can output features corresponding to new face images that are input. Specifically, after the training is completed, a new face image can be input at encoder input 410 of encoder 210, and corresponding features can be obtained at encoder output 414.

Figure 4B:
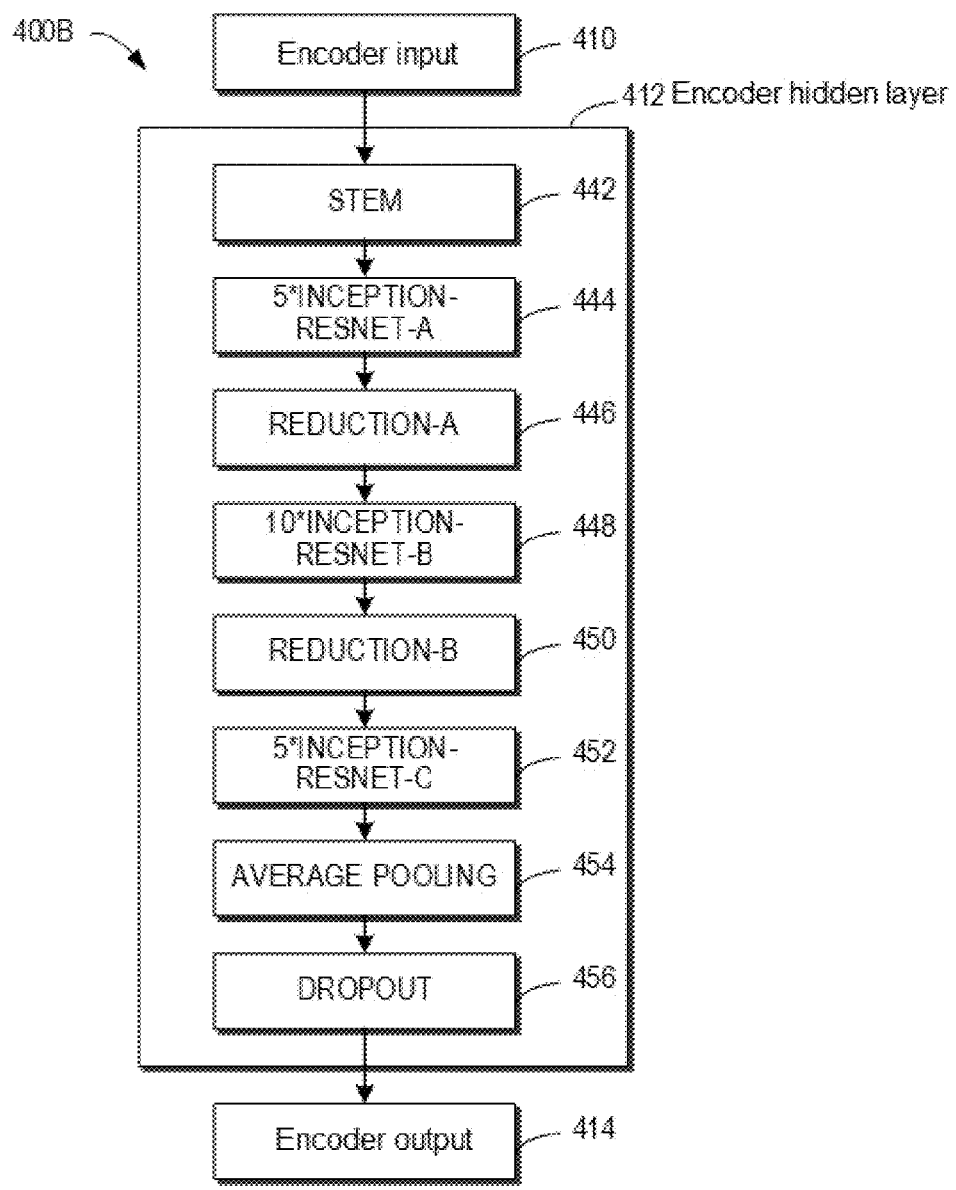
FIG. 4B schematically illustrates a block diagram of an encoder in a neural network model according to an example implementation of the present disclosure.

Hereinafter, more details regarding encoder 210 will be described with reference to FIG. 4B. FIG. 4B schematically illustrates block diagram 400B of an encoder in a neural network model according to an example implementation of the present disclosure. As shown in FIG. 4B, encoder hidden layer 412 may include various layers other than encoder input 410 and encoder output 414. Specifically, encoder hidden layer 412 may include a plurality of neural network layers. For example, STEM layer 442 can be used to perform convolution-related functions. 5*INCEPTION-RESNET-A layer 444, 10*INCEPTION-RESNET-B layer 448, and 5*INCEPTION-RESNET-C layer 452 can be used to perform deep residual network-related functions, REDUCTION-A layer 446 and REDUCTION-B layer 450 can be used to perform reduction-related functions, AVERAGE POOLING layer 454 can be used to perform pooling-related functions, and DROPOUT layer 456 can be used to perform discard-related functions.

It will be understood that FIG. 4B only schematically illustrates an example of an encoder implemented according to a structure of a neural network model. According to an example implementation of the present disclosure, structures of a variety of neural network models that have been developed currently and/or will be developed in the future can be selected to implement the encoder.

It will be understood that encoder 210 can be deployed in an IoT cloud since the operation of extracting features by encoder 210 involves complex computing processes and needs a large number of computing resources. In this manner, it is only necessary to transmit collected sample data to encoder 210, and the demand of computing tasks at the edge layer and the IoT device layer for computing resources can be reduced. In the context of the present disclosure, remote devices and local devices are relative concepts, and remote devices and local devices can be determined based on the distance from sample data. For example, a computing device in the IoT cloud may be referred to as a remote device, and a device in the edge layer and/or IoT device layer that is close to sample data may be referred to as a local device.

Details regarding encoder 210 have been described, and more details regarding classifier 220 will be described below by returning to FIG. 3. At block 320 of FIG. 3, a category probability corresponding to the sample data can be acquired based on classifier 220 deployed in a local device in the Internet of Things environment and the features. It will be understood that classifier 220 can be trained using a second sample data set that includes less sample data. Suppose that the access control system is used to control the opening/closing of a data center of the company and that there are only 3 administrators in the company who are allowed to enter the data center. In this case, face images of the 3 administrators can be used to train classifier 220. In this case, generated classifier 220 has simple functions and requires only a small number of computing resources, so that limited computing resources in a local device can be used to run classifier 220. For example, classifier 220 can be run using a small terminal device used to control the image collection device and/or door lock.

In this case, the number "3" of pieces of sample data in the second sample data set is much smaller than the number "100,000" of pieces of data in the first sample data set. According to an example implementation of the present disclosure, the two sample data sets may not have an intersection. In this manner, encoder 210 and classifier 220 can be trained respectively in an independent manner so that encoder 210 and classifier 220 can work independently of each other, thereby avoiding unnecessary coupling between the two.

Figure 5A:
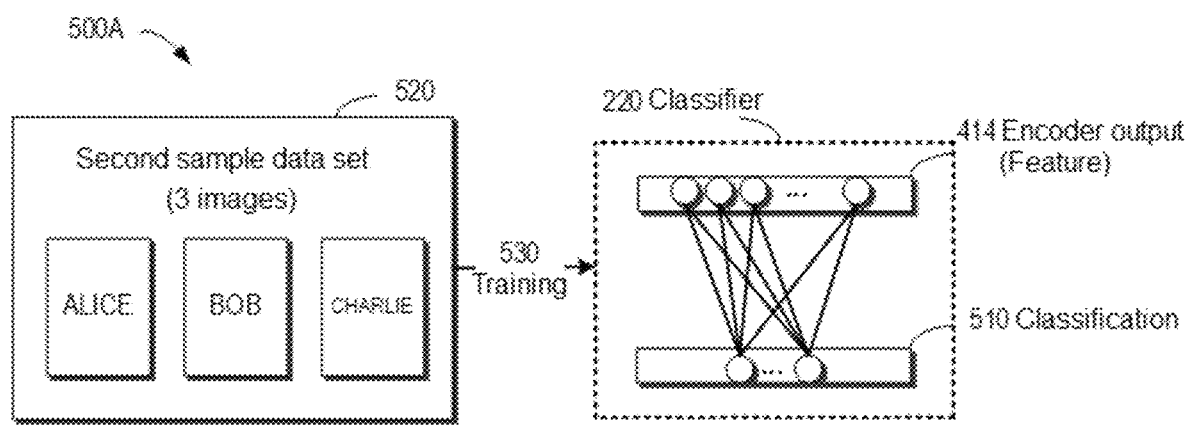
FIG. 5A schematically illustrates a block diagram for training a classifier in a neural network model according to an example implementation of the present disclosure.

Hereinafter, more details regarding the training of classifier 220 will be described with reference to FIG. 5A. FIG. 5A schematically illustrates block diagram 500A for training a classifier in a neural network model according to an example implementation of the present disclosure. As shown in FIG. 5A, second sample data set 520 may include face images of 3 administrators, Alice, Bob, and Charlie. The 3 face images mentioned above can be used as samples to train 530 classifier 220 in order to obtain lightweight classifier 220. When the training has been completed, classifier 220 can classify features of a newly input face image to corresponding classification 510.

According to an example implementation of the present disclosure, the category probability can be represented in the form of vector (v1, v2, v3). For example, each dimension in vector (v1, v2, v3) may represent the probability of determining which administrator the input face image belongs to, where v1 represents the probability that the face image belongs to the first administrator, Alice, v2 represents the probability that the face image belongs to the second administrator, Bob, and v3 represents the probability that the face image belongs to the third administrator, Charlie. The range of each dimension can be defined as [0, 1] (or other ranges). It will be understood that the three-dimensional vector shown above is only an example for representing classifications, and the category probability may include higher dimensions when more face images are used to train classifier 220.

Returning to FIG. 3, at block 330, the sample data is classified into a predetermined category in response to determining that the category probability satisfies a first threshold condition. Still referring to the example above, suppose that the 3 administrators include: Alice, Bob, and Charlie. According to an example implementation of the present disclosure, a predetermined threshold condition can be specified so as to determine classification 510 of a face image (i.e., to determine the face image as belonging to a particular administrator) when the probability category satisfies that threshold condition. For example, it may be defined that when a particular dimension in the classifications is above a threshold of 0.5 (or other values), the input face image is confirmed to belong to an administrator corresponding to that particular dimension. Specifically, suppose that the classification vector of the input face image is [0.71, 0.23, 0.06] and the three dimensions correspond to Alice, Bob and Charlie, respectively. Since 0.71>0.5, it can be determined that the input face image belongs to administrator Alice, and the access control device can be turned on and Alice is allowed to enter. For another example, suppose that the classification vector of the input face image is [0.40, 0.51, 0.09], then it is determined that the input face image belongs to administrator Bob.

With the example implementation of the present disclosure, the computing power of a local device can be fully utilized to perform method 300 described above. Compared with running the entire heavyweight neural network model at the edge layer and/or IoT device layer, by using the example implementation of the present disclosure, heavyweight encoding tasks can be performed by a high-performance computing device in the IoT cloud, and only lightweight classification tasks may be performed at the edge layer and/or IoT device layer.

Figure 5B:
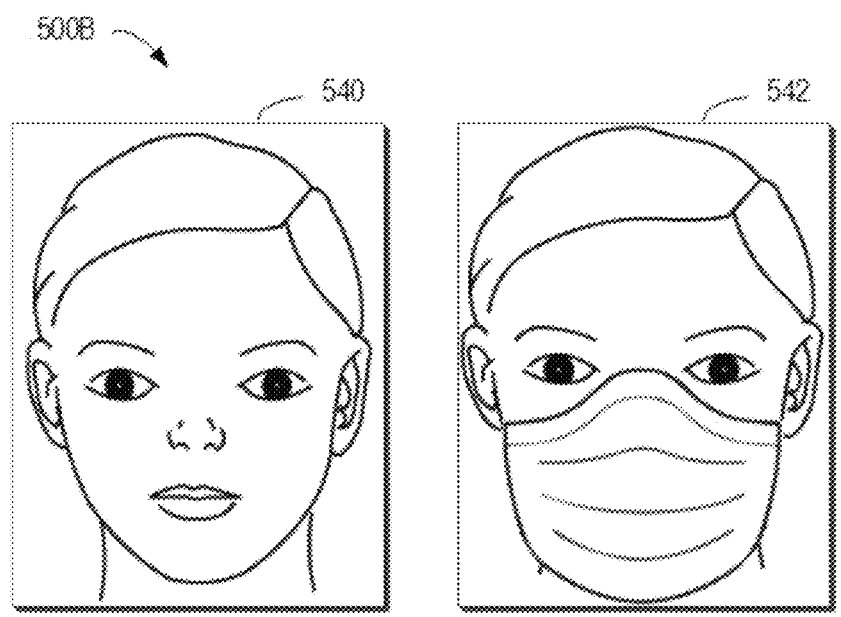
FIG. 5B schematically illustrates a block diagram of sample data for respectively training and updating a classifier according to an example implementation of the present disclosure.

The general case for deploying and using encoder 210 and classifier 220 for face recognition has been described above, and other special cases where certain face images cannot be recognized will be described below with reference to FIG. 5B. FIG. 5B schematically illustrates block diagram 500B of sample data for respectively training and updating a classifier according to an example implementation of the present disclosure. As shown in FIG. 5B, face image 540 represents the training data for use in training classifier 220. It will be understood that, during actual use of an access control system, the quality of collected face images may be significantly lower than the quality of training data due to environmental factors such as occlusions and lighting, which results in that the category probability output by classifier 220 cannot satisfy the threshold condition defined above.

According to an example implementation of the present disclosure, subsequent processing steps can also be provided to address the problem that face recognition cannot be performed accurately. Specifically, if it is determined that the category probability does not satisfy the first threshold condition, a category identifier associated with the sample data can be acquired, and the sample data can be classified into a category corresponding to the category identifier. During actual use of the access control system, suppose that administrator Bob wears a mask, then the camera device collects image 542 at this moment. Image 542 can be transmitted to encoder 210 to obtain features of image 542, which may further be input to classifier 220 to obtain a classification. At this point, the classification output by classifier 220 can be [0.44, 0.45, 0.11]. Since the value of each dimension is below the threshold of 0.5, it is not possible to determine to whom image 542 belongs.

In this case, "face recognition failed" may be prompted, and the user may be further asked to provide a category identifier associated with image 542. The user can provide the category identifier based on a variety of manners. For example, the user can use a physical category identifier (such as employee card and fingerprint) to prove his or her identity. For another example, the user can use information such as a dynamic verification code to prove his or her identity and have the right to enter the data center. It will be understood that the above only schematically illustrates a situation when face recognition fails when the user wears a mask. According to an example implementation of the present disclosure, other situations may also cause noise in images. For example, shadows due to insufficient light, occlusions due to wearing sunglasses, masks, etc., spots due to fouling of the image collection device, etc., and artifacts due to user movement may all cause noise in image 542 when the face image is collected.

According to an example implementation of the present disclosure, a threshold number of training samples for updating encoder 210 and/or classifier 220 can be specified in advance, and an update process can be performed when the number of images resulting in a face recognition failure reaches that threshold number. Specifically, the sample data that results in a face recognition failure as described above and categories input based on physical category identifiers and/or dynamic verification codes can be added to a third sample data set. Further, this third sample data set can be used to update encoder 210 and/or classifier 220.

Figure 6:
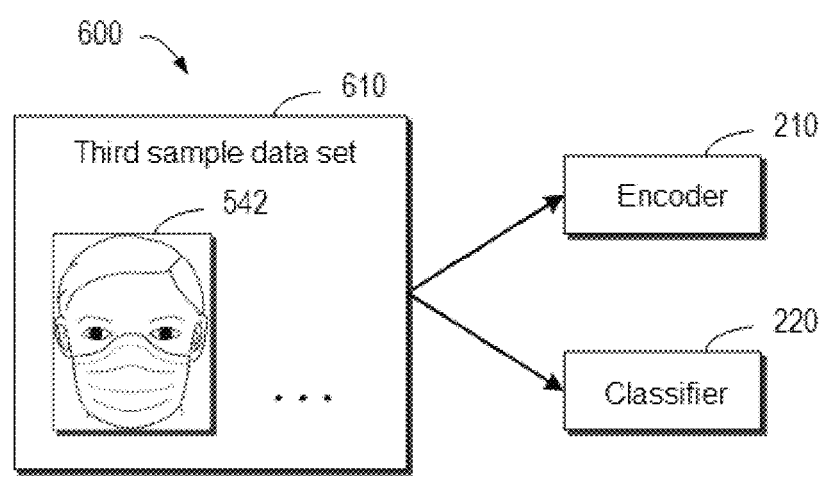
FIG. 6 schematically illustrates a block diagram for updating an encoder and a classifier according to an example implementation of the present disclosure.

Hereinafter, more details regarding the update operation will be described with reference to FIG. 6. FIG. 6 schematically illustrates block diagram 600 for updating an encoder and a classifier according to an example implementation of the present disclosure. As shown in FIG. 6, with the use of the face recognition system, third sample data set 610 may include more and more sample data. If it is determined that the number of pieces of sample data in third sample data set 610 satisfies a second threshold condition, third sample data set 610 can be used to update classifier 220. For example, it can be specified that the update operation is performed when the number of pieces of sample data in third sample data set 610 exceeds 3 (or some other values). Specifically, each piece of sample data in third sample data set 610 can be processed in a similar manner to update classifier 220 and/or encoder 210.

According to an example implementation of the present disclosure, third sample data set 610 can be utilized to update classifier 220. For example, image 542 that results in a face recognition failure and a classification (i.e., administrator Bob) associated with that image can be utilized to update classifier 220. A variety of training techniques currently known and/or to be developed in the future can be used to update classifier 220. When features of image 542 are input to updated classifier 220, classifier 220 can accurately output: administrator Bob. With the example implementation of the present disclosure, classifier 220 can be continuously updated with newly collected images, so that classifier 220 can gradually recognize face images including noise that are taken in more complex environments. In this manner, the requirements of the access control system for the environment in which the sample data is collected can be reduced, and the accuracy of classifier 220 can be improved.

It will be understood that the accuracy of face recognition depends on both encoder 210 and classifier 220. According to an example implementation of the present disclosure, third sample data set 610 can be further utilized to update encoder 210. Specifically, the third sample data set can be sent to encoder 210 to cause encoder 210 to be updated using the third sample data set. According to an example implementation of the present disclosure, encoder 210 can be updated in an off-line manner. Specifically, encoder 210 can be updated based on triplet loss.

Continuing with the Facenet-based example above, the model may include 22 layers and can directly output 128-dimensional embedding. In this neural network model, the loss function used in the last layer is referred to as the triplet loss. Facenet includes a batch input layer and a deep convolutional neural network, followed by L2 normalization in order to output features of a face image. Facenet also involves triplet loss during training. In the context of the present disclosure, the deep convolutional neural network can be considered as a black box, where $f(x) \in R^d$ encodes image x as features in the d dimensional Euclidean space, and $\|f(x)\|=1$.

The triplet loss is a special loss function in Facenet, illustrated as follows:

$$\|f(x_i^a)-f(x_i^p)\|_2^2+\alpha<\|f(x_i^a)-f(x_i^n)\|_2^2 \tag{1}$$

When updating encoder 210, it is desirable to ensure that the image $x_i^a$ of a particular user (e.g., Bob) is closer to the other images $x_i^p$ (positive samples) of that particular user Bob than any image (negative samples) of any other user (i.e., people other than Bob), and there is a mandatory interval α between a pair of positive and negative samples. Based on the above principle, the loss function to be minimized can be set as follows:

$$\Sigma_i^N[\|f(x_i^a)-f(x_i^p)\|_2^2-\|f(x_i^a)-f(x_i^n)\|_2^2+\alpha]_+ \tag{2}$$

During triplet selection, for given $x_i^a$, $x_i^p$ and $x_i^n$ need to be selected. Random selection can easily satisfy (2) above, but cannot effectively optimize encoder 210. If a hard example is used (i.e., selecting a triplet based on argmax $x_i^p\|f(x_i^a)-f(x_i^p)\|_2^2$ and argmin $x_i^n\|f(x_i^a)-f(x_i^n)\|_2^2$), this may lead to model corruption. Further, it is not feasible to compute argmin and argmax over the entire training set. Thus, this can be done by selecting hard positive/negative samples from small batches. According to an example implementation of the present disclosure, instead of selecting the hardest positive samples, all anchor point-positive sample pairs in small batches can be used, while still selecting hard negative samples. Specifically, $x_i^n$ can be randomly selected against an anchor point-positive sample pair from the negative samples satisfying the following equation to perform the update process:

$$\|f(x_i^a)-f(x_i^n)\|_2^2 - \|f(x_i^a)-f(x_i^p)\|_2^2 < \alpha \quad (3)$$

It will be understood that the process above only schematically describes a specific example for updating encoder 210. According to an example implementation of the present disclosure, encoder 210 can be updated on the basis of triplet loss based on a variety of methods currently known and/or to be developed in the future. According to an example implementation of the present disclosure, encoder 210 can be updated using face images of Alice, Bob, and Charlie, respectively, when wearing a mask to improve the confidence level of encoder 210. Table 1 below schematically illustrates confidence levels of encoder 210 before and after the update.

TABLE 1

Comparison of confidence levels of encoder

| Sample ID | User | Correct or not | Confidence level of original encoder | Confidence level of updated encoder |
|---|---|---|---|---|
| 0 | Alice | Yes | 0.89 | 0.97 |
| 1 | Alice | Yes | 0.87 | 0.96 |
| 2 | Bob | Yes | 0.75 | 0.91 |
| 3 | Bob | Yes | 0.86 | 0.85 |
| 4 | Charlie | Yes | 0.86 | 0.96 |
| 5 | Charlie | Yes | 0.86 | 0.94 |

In Table 1, column 1 shows the identifier of the sample data, column 2 shows which user's face image the sample data is, column 3 shows whether the classification result is correct, and columns 4 and 5 show the confidence levels of the encoder before and after the update, respectively. As can be seen from the statistical data in Table 1, the confidence level of the updated encoder is improved. With the example implementation of the present disclosure, the confidence level of the encoder can be improved, which in turn improves the accuracy of classification results output by classifier 220 later. In this manner, the accuracy of the face recognition model can be improved, and the entire face recognition model can be made suitable for processing face images collected under a variety of conditions.

After encoder 210 and classifier 220 have been updated using the process described above, respectively, updated encoder 210 and classifier 220 can be used to process newly collected sample data. Specifically, the newly collected sample data can be transmitted to encoder 210, and corresponding features can be received from the updated encoder. Further, the received features can be input to the updated classifier to acquire a category probability corresponding to the new sample data. Hereinafter, the complete process for processing sample data will be described with reference to FIG. 7.

Figure 7:
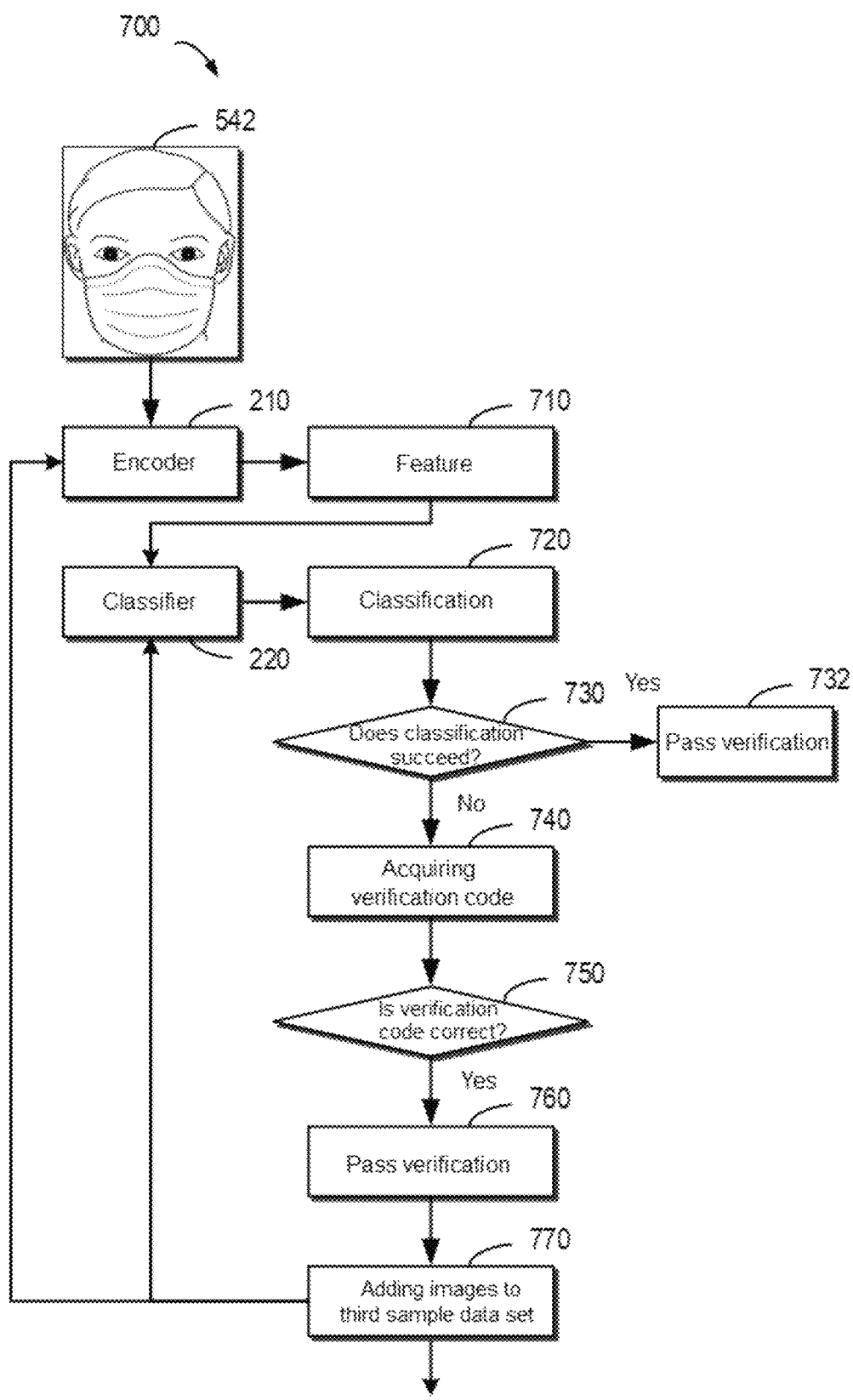
FIG. 7 schematically illustrates a flow chart of a method for processing sample data according to an example implementation of the present disclosure.

Specifically, FIG. 7 schematically illustrates a flow chart of method 700 for processing sample data according to an example implementation of the present disclosure. As shown in FIG. 7, face image 542 of a user can be collected and this face image 542 can be transmitted to encoder 210. Feature 710 of the face image can be received from encoder 210, and feature 710 can be input to classifier 220. Classification 720 can be received from classifier 220. At block 720, if the classification succeeds at this point (positive determination at block 730), the method proceeds to block 732 to pass verification (in other words, to open the access control when it is confirmed that face image 542 belongs to one of the 3 administrators). If the classification fails (negative determination at block 730), the method proceeds to block 740 to acquire a verification code. If the verification code is determined to be correct at block 750, method 700 proceeds to block 760 to pass the verification. Following this, face image 542 can be added to a third sample data set at block 770 to use this third sample data set to update encoder 210 and classifier 220.

With the example implementations of the present disclosure, during a face recognition process, by deploying encoder 210 and classifier 220 respectively at different locations in the IoT environment, devices with more computing power in the IoT can be utilized as much as possible to speed up the face recognition process. Further, encoder 210 and classifier 220 can be updated based on face images that result in recognition failures during the face recognition process. In this manner, the face recognition system can be continuously updated based on newly collected data, thereby improving the overall performance of the entire face recognition system.

It will be understood that although the method for configuring a neural network model is described above using an access control system based on face recognition as a specific example, according to an example implementation of the present disclosure, the method described above can be used in neural network models for implementing other functions. For example, the method described above can be implemented in other Internet of Things environments such as production line monitoring systems and traffic control systems.

Examples of the method according to the present disclosure have been described in detail above with reference to FIGS. 2 to 7, and implementations of a corresponding apparatus will be described below. According to an example implementation of the present disclosure, an apparatus for processing sample data in an Internet of Things environment is provided. This apparatus includes: a receiving module configured to receive features of the sample data from an encoder deployed in a remote device in the Internet of Things environment; an acquiring module configured to acquire a category probability corresponding to the sample data based on a classifier deployed in a local device in the Internet of Things environment and the features; and a classifying module configured to classify the sample data into a predetermined category in response to determining that the category probability satisfies a first threshold condition. According to an example implementation of the present disclosure, this apparatus further includes modules for performing other steps in method 300 and/or method 700 described above.

Figure 8:
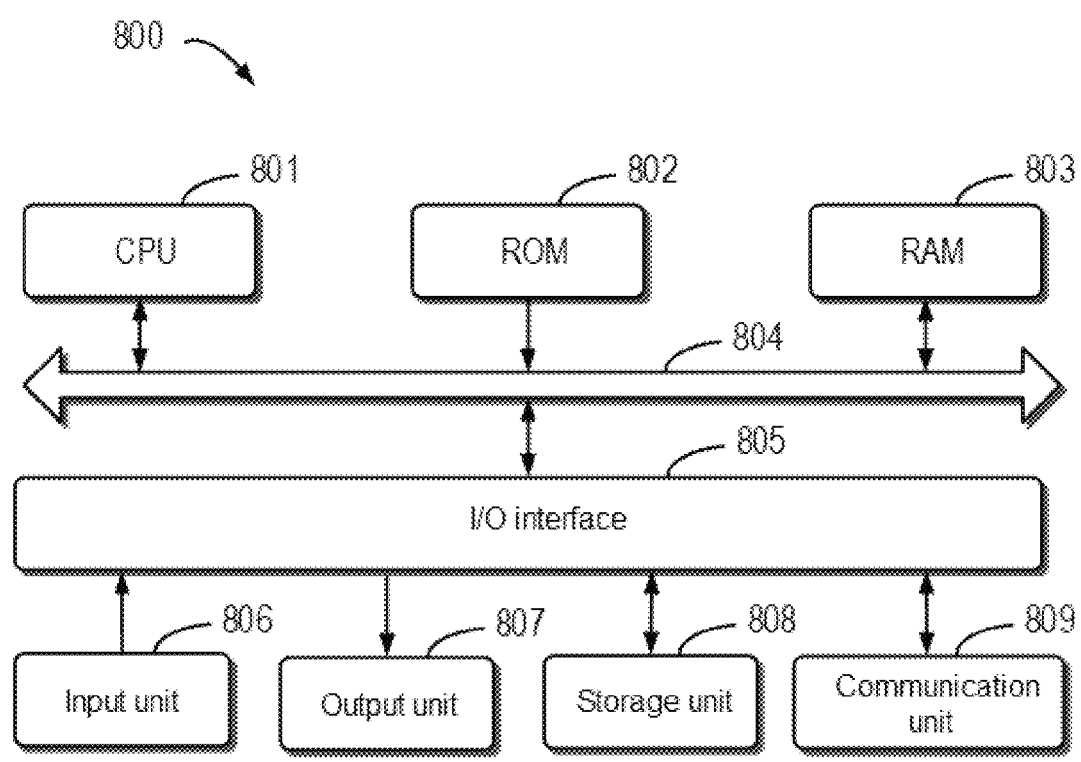
FIG. 8 schematically illustrates a block diagram of a device for processing sample data according to an example implementation of the present disclosure.

FIG. 8 schematically illustrates a block diagram of device 800 according to an example implementation of the present disclosure. As shown in the figure, device 800 includes central processing unit (CPU) 801, which may execute various appropriate actions and processing in accordance with computer program instructions stored in read-only memory (ROM) 802 or computer program instructions loaded from storage unit 808 onto random access memory (RAM) 803. Various programs and data required for the operation of device 800 may also be stored in RAM 803. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit

809, such as a network card, a modem, and a wireless communication transceiver. Communication unit 809 allows device 800 to exchange information/data with other devices via a computer network, such as the Internet, and/or various telecommunication networks.

The various processes and processing procedures described above, such as method 300 and/or method 700, may be performed by CPU 801. For example, in some implementations, method 300 and/or method 700 may be implemented as a computer software program that is tangibly included in a machine-readable medium, such as storage unit 808. In some implementations, part or all of the computer program may be loaded and/or installed onto device 800 via ROM 802 and/or communication unit 809. One or more steps of method 300 and/or method 700 described above may be performed when the computer program is loaded into RAM 803 and executed by CPU 801. Alternatively, in other implementations, CPU 801 may also be configured in any other suitable manner to implement the above processes/methods.

According to an example implementation of the present disclosure, an electronic device is provided, including: at least one processor; and a memory coupled to the at least one processor, wherein the memory has instructions stored therein which, when executed by the at least one processor, cause the device to perform actions for processing sample data in an Internet of Things environment. The actions include: receiving features of the sample data from an encoder deployed in a remote device in the Internet of Things environment; acquiring a category probability corresponding to the sample data based on a classifier deployed in a local device in the Internet of Things environment and the features; and classifying the sample data to a predetermined category in response to determining that the category probability satisfies a first threshold condition.

According to an example implementation of the present disclosure, the encoder is trained using a first sample data set and the classifier is trained using a second sample data set, the number of pieces of sample data in the second sample data set being smaller than the number of pieces of data in the first sample data set, and the first sample data set and the second sample data set having no intersection.

According to an example implementation of the present disclosure, the actions further include: in response to determining that the category probability does not satisfy the first threshold condition, acquiring a category identifier associated with the sample data; and classifying the sample data into a category corresponding to the category identifier.

According to an example implementation of the present disclosure, the actions further include: adding the sample data and the category to a third sample data set; and updating the classifier using the third sample data set in response to determining that the number of pieces of sample data in the third sample data set satisfies a second threshold condition.

According to an example implementation of the present disclosure, the actions further include: sending the third sample data set to the encoder to cause the encoder to be updated using the third sample data set.

According to an example implementation of the present disclosure, the sample data belongs to the same category as training samples in the second sample data set, and the sample data includes noise data.

According to an example implementation of the present disclosure, the sample data includes face images, and the noise data includes any one of shadows, occlusions, spots, and artifacts in the face images.

According to an example implementation of the present disclosure, acquiring the category identifier associated with the sample data includes acquiring the category identifier based on at least any one of the following: based on a dynamic verification code associated with the sample data; and based on a physical category identifier associated with the sample data.

According to an example implementation of the present disclosure, the actions further include at least any one of the following: receiving features of the sample data from an updated encoder; and acquiring a category probability corresponding to the sample data based on the updated classifier and the received features.

According to an example implementation of the present disclosure, the device is deployed at a local device in the Internet of Things environment.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided, the computer-readable medium storing machine-executable instructions which, when executed by at least one processor, cause the at least one processor to implement the method according to the present disclosure.

Illustrative embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives a computer-readable program instruction from a network and forwards the computer-readable program instruction for storage in the computer-readable storage medium in the computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, or partly on a user computer, or as a stand-alone software package, or partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. The computer-readable program instructions may also be stored in the computer-readable storage medium. The instructions enable a computer, a programmable data processing apparatus, and/or other devices to operate in a specific manner, so that the computer-readable medium storing the instructions includes an article of manufacture that includes instructions for implementing various aspects of functions/actions specified in one or more blocks in the flow charts and/or the block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to a plurality of implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations will be apparent to persons of ordinary skill in the art without departing from the scope and spirit of the illustrated implementations. The selection of terms as used herein is intended to best explain principles and practical applications of the various implementations or improvements to technologies on the market, so as to enable persons of ordinary skill in the art to understand the implementations disclosed herein.

What is claimed is:
1. A method for processing sample data in an Internet of Things environment, including:
   receiving features of the sample data from an encoder deployed in a remote device in the Internet of Things environment;
   acquiring a category probability corresponding to the sample data based on a classifier deployed in a local device in the Internet of Things environment and the features; and
   classifying the sample data into a predetermined category in response to determining that the category probability satisfies a first threshold condition;
   wherein the encoder is trained using a first sample data set and the classifier is trained using a second sample data set different than the first sample data set; and
   wherein in response to determining that the category probability does not satisfy the first threshold condition:
   acquiring a category identifier associated with the sample data;
   classifying the sample data into a category corresponding to the category identifier; and
   adding the sample data and the category to a third sample data set that is used to update the classifier.
2. The method according to claim 1, wherein the number of pieces of sample data in the second sample data set is smaller than the number of pieces of data in the first sample data set, and the first sample data set and the second sample data set have no intersection.

3. The method according to claim 1, further including:
updating the classifier using the third sample data set in response to determining that the number of pieces of sample data in the third sample data set satisfies a second threshold condition.

4. The method according to claim 1, including:
sending the third sample data set to the encoder to cause the encoder to be updated using the third sample data set.

5. The method according to claim 1, wherein the sample data belongs to the same category as training samples in the second sample data set, and the sample data includes noise data.

6. The method according to claim 5, wherein the sample data includes face images, and the noise data includes any one of shadows, occlusions, spots, and artifacts in the face images.

7. The method according to claim 1, wherein acquiring the category identifier associated with the sample data includes acquiring the category identifier based on at least any one of the following:
based on a dynamic verification code associated with the sample data; and
based on a physical category identifier associated with the sample data.

8. The method according to claim 1, further including at least any one of the following:
receiving features of the sample data from an updated encoder; and
acquiring a category probability corresponding to the sample data based on the updated classifier and the received features.

9. The method according to claim 1, wherein the method is implemented at a local device in the Internet of Things environment.

10. An electronic device, including:
at least one processor; and
memory coupled to the at least one processor, wherein the memory has instructions stored therein which, when executed by the at least one processor, cause the electronic device to perform actions for processing sample data in an Internet of Things environment, the actions including:
receiving features of the sample data from an encoder deployed in a remote device in the Internet of Things environment;
acquiring a category probability corresponding to the sample data based on a classifier deployed in a local device in the Internet of Things environment and the features; and
classifying the sample data into a predetermined category in response to determining that the category probability satisfies a first threshold condition;
wherein the encoder is trained using a first sample data set and the classifier is trained using a second sample data set different than the first sample data set; and
wherein in response to determining that the category probability does not satisfy the first threshold condition:
acquiring a category identifier associated with the sample data;
classifying the sample data into a category corresponding to the category identifier; and
adding the sample data and the category to a third sample data set that is used to update the classifier.

11. The electronic device according to claim 10, wherein the number of pieces of sample data in the second sample data set is smaller than the number of pieces of data in the first sample data set, and the first sample data set and the second sample data set have no intersection.

12. The electronic device according to claim 10, wherein the actions further include:
updating the classifier using the third sample data set in response to determining that the number of pieces of sample data in the third sample data set satisfies a second threshold condition.

13. The electronic device according to claim 10, wherein the actions further include:
sending the third sample data set to the encoder to cause the encoder to be updated using the third sample data set.

14. The electronic device according to claim 10, wherein the sample data belongs to the same category as training samples in the second sample data set, and the sample data includes noise data.

15. The electronic device according to claim 14, wherein the sample data includes face images, and the noise data includes any one of shadows, occlusions, spots, and artifacts in the face images.

16. The electronic device according to claim 10, wherein acquiring the category identifier associated with the sample data includes acquiring the category identifier based on at least any one of the following:
based on a dynamic verification code associated with the sample data; and
based on a physical category identifier associated with the sample data.

17. The electronic device according to claim 10, wherein the device is deployed at a local device in the Internet of Things environment, and the actions further include at least any one of the following:
receiving features of the sample data from an updated encoder; and
acquiring a category probability corresponding to the sample data based on the updated classifier and the received features.

18. A computer program product tangibly stored on a non-transitory computer-readable medium and including machine-executable instructions, wherein the machine-executable instructions, when executed by a machine, cause the machine to perform actions for processing sample data in an Internet of Things environment, the actions including:
receiving features of the sample data from an encoder deployed in a remote device in the Internet of Things environment;
acquiring a category probability corresponding to the sample data based on a classifier deployed in a local device in the Internet of Things environment and the features; and
classifying the sample data into a predetermined category in response to determining that the category probability satisfies a first threshold condition;
wherein the encoder is trained using a first sample data set and the classifier is trained using a second sample data set different than the first sample data set; and
wherein in response to determining that the category probability does not satisfy the first threshold condition:
acquiring a category identifier associated with the sample data;

classifying the sample data into a category corresponding to the category identifier; and adding the sample data and the category to a third sample data set that is used to update the classifier.

19. The computer program product according to claim 18, wherein the actions further include:

sending the third sample data set to the encoder to cause the encoder to be updated using the third sample data set.

20. The computer program product according to claim 18, wherein the sample data belongs to the same category as training samples in the second sample data set, and the sample data includes noise data.

* * * * *